March 19, 1968
A. JUBB
3,373,561
GAS TURBINE POWERPLANT
Filed Oct. 14, 1966
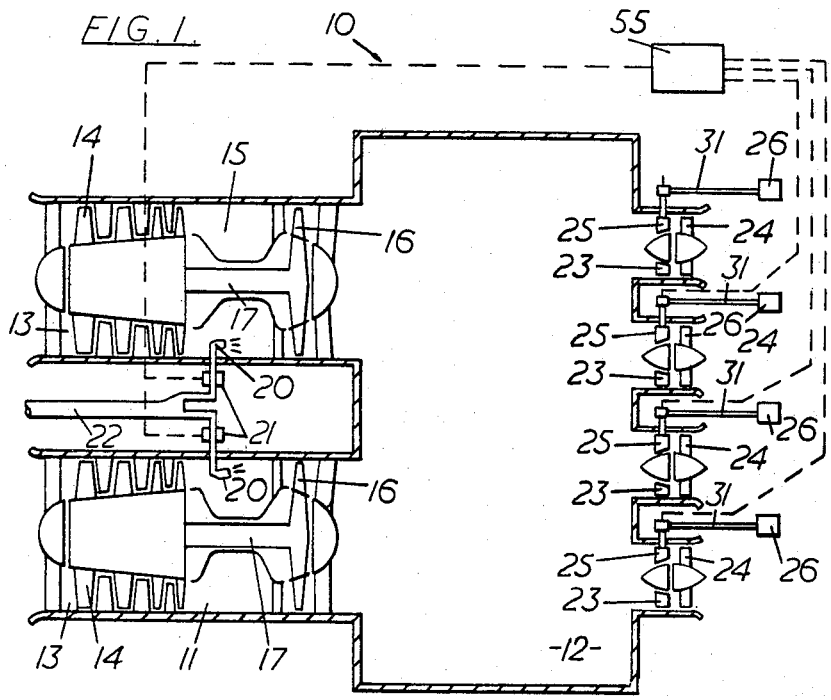
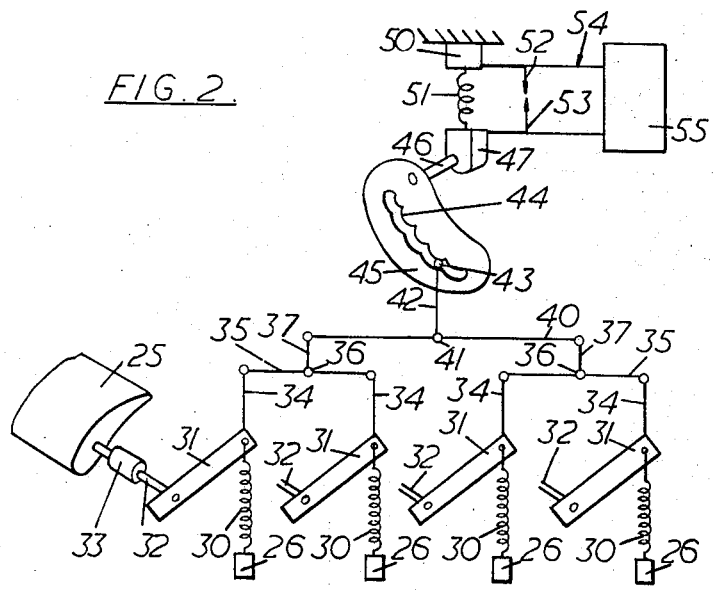
Inventor
Albert Jubb
By
Cushman, Darby & Cushman
Attorneys

United States Patent Office 3,373,561
Patented Mar. 19, 1968

3,373,561
GAS TURBINE POWERPLANT
Albert Jubb, Derby, England, assignor to Rolls-Royce Limited, Derby, England, a British company
Filed Oct. 14, 1966, Ser. No. 586,771
Claims priority, application Great Britain, Oct. 18, 1965, 44,102/65
7 Claims. (Cl. 60—39.15)

This invention concerns a gas turbine powerplant.

According to the present invention, there is provided a powerplant comprising at least one gas turbine engine having a fuel supply thereto, a plenum chamber which is arranged to receive exhaust gases from the or each engine and which has a plurality of outlets through each of which the exhaust gases may be discharged, a plurality of free power turbines which are respectively mounted in outlets, and control means, responsive to changes in the rotational speeds of the free power turbines, for effecting adjustment of the fuel supply to the engine or engines, said control means comprising outlet area adjustment devices, for altering the effective areas of the respective outlets so as to adjust the rotational speeds of the respective free power turbines, the outlet area adjustment devices being interconnected so that an effective increase or decrease in one said area is respectively accompanied by an effective decrease or increase in the other said area or aras, whereby the total effective area of all the outlets, prior to the said adjustment of the fuel supply, is maintained substantially constant.

Since the total effective area of the said outlet or outlets is not substantially altered prior to the adjustment of the fuel supply, the power of the engine or engines will be adjusted without the risk that a compressor of the engine may surge or that there may be choked flutter of its compressor blades.

Thus, each free power turbine may be provided with a governor which is responsive to the rotational speed of the respective turbine and which is connected to the respective outlet area adjustment device so as to be able to apply an opening or closing force thereto, the outlet area adjustment devices being interconnected by a linkage which ensures that the forces applied by the governors to the outlet area adjustment devices effect adjustment of the latter so that the relationship between the rotational speed of each of the free power turbines and that selected by its respective governor is substantially the same for all the free power turbines, the said linkage being connected to means for controlling the fuel supply to the engines so as to adjust the fuel supply in such a way that the rotational speeds of the various free power turbines are brought to individually selected values.

The linkage is preferably connected to an anchorage by means which urge the linkage towards the anchorage, but which permit some limited movement of the linkage away from the anchorage.

The means for controlling the fuel supply is preferably itself controlled in dependence upon the position of the linkage with respect to the anchorage.

Means may be provided for adjusting the connection between the linkage and the anchorage in dependence upon the number of engines being employed. Each outlet area adjustment device preferably comprises variable nozzle guide vanes. The said variable nozzle guide vanes of each turbine may be adjusted by a power servo which is itself controlled in dependence upon the position of a lever, said lever forming part of said linkage and being connected by a resilient or like connection to the respective governor so as to tend to be positioned thereby.

The invention is illustrated, merely by way of example, in the accompanying drawings, in which:

FIGURE 1 is a diagrammatic sectional view of a powerplant according to the present invention, and FIGURE 2 is a diagrammatic perspective view of part of the powerplant of FIGURE 1.

Referring to the drawings, an industrial powerplant 10 comprises a plurality (e.g. four) of gas turbine engines 11, the exhaust gases from each of which are discharged into a common plenum chamber 12. Each of the engines 11 comprises an air intake 13, a multi-stage axial compressor 14, combustion equipment 15 and a turbine 16, the turbine 16 driving the compressor 14 through a shaft 17.

Each of the combustion equipments 15 is provided with one or more fuel injectors 20, the fuel injector or injectors 20 of each engine 11 being suplied with fuel from a fuel supply control unit 21 which is itself supplied with fuel by way of a fuel conduit 22.

If desired, diverting valves (not shown) may be provided which permit jet gases from a selected engine or engines 11 to be discharged to atmosphere without passing to the plenum chamber 12. In this case, non-return valves (not shown) will be provided to prevent reverse flow.

The plenum chamber 12 is provided with a plurality (e.g. four as shown) of outlets 23 through which the jet gases may be discharged to atmosphere. Mounted in each of the outlets 23 is a free power turbine 24, each free power turbine 24 driving a load (not shown).

Each of the free power turbines 24 is provided with variable nozzle guide vanes 25 which may be adjusted so as to alter the effective area of the respective outlet 23, and thus change the rotational speed of the respective free power turbine 24.

Each of the free power turbines 24 is provided with a governor 26 which is responsive to the rotational speed of the respective free power turbine, and which is therefore responsive to the load thereon.

Each of the governors 26 is connected by way of a spring 30 (FIGURE 2) to a lever 31. Each of the levers 31 is mounted on a shaft 32 for rotation therewith, the shaft 32 forming part of a low input torque power servo 33 which controls the position of the respective variable nozzle guide vanes 25 in dependence upon the angular position of the shaft 32. Thus the position of the lever 31 controls the position of the variable nozzle guide vanes 25.

The levers 31 of the four turbines 24 are arranged as two pair of levers, the levers 31 of each said pair being pivotally connected by links 34 to a common link 35. Each of the links 35 is pivotally connected at its midpoint 36 to a link 37, the links 37 being themselves pivotally connected to a common link 40. The link 40 is pivotally connected at its mid-point 41 to a link 42 having, at its end remote from the mid-point 41, a roller 43 which is engaged in a track 44 in a cam 45. The cam 45 is mounted on a shaft 46 which is rotatably mounted in a block 47. The block 47 is connected to an anchorage 50 by way of a very stiff spring 51 which urges the block 47 towards the anchorage 50.

Electrical contacts 52, 53, which are normally in contact with each other, are respectively carried by the anchorage 50 and by the block 47 and form part of a control circuit 54. The control circuit 54 controls a device 55 which signals information to the fuel supply control units 21 as to the required fuel supply to be delivered to the engines 11.

The springs 51 thus urges the linkage provided by the members 31, 34, 35, 37, 40 towards the anchorage 50, but permits some limited movement of the linkage 31, 34, 35, 37, 40 away from the anchorage 50. The device 55 is thus controlled in dependence upon the position of the linkage 31, 34, 35, 37, 40 with respect to the anchorage 50.

The cam 45 provides a means for adjusting the connection between the said linkage and the anchorage 50, in dependence upon the number of engines 11 being employed.

If, in operation, the load on one of the free power turbines 24 increases, the rotational speed thereof will fall. The respective governor 26 will therefore exert on the respective spring 30 a force which will tend to move the respective variable nozzle guide vanes 25 in a direction such as to increase the effective area of the respective outlet 23. This force will not, however, be fully transmitted to the variable nozzle guide vanes 25, since it will be resisted by the springs 30 of the remaining free power turbines 24. That is to say, the force will tend to move the respective lever 31 in a given angular sense, and this will cause pivotal movement of the respective link 35 which will be resisted by the spring 30 of the adjacent governor 26. At the same time, the link 40 will be pivoted about its midpoint 41, such pivotal movement being resisted to some extent by the springs 30 of the other pair of governors 26. The result will therefore be that, if the governor 26 of the underpowered free power turbine 24 is attempting to move its nozzle guide vanes 25 so as to achieve a 20% increase in the area of its outlet 23, it will in fact achieve an increase of area of the said outlet of 15% and this will be accompanied by a reduction in the areas of the other outlets 23 by 5% in each case, The total effective area of the four outlets 23 will therefore, at this stage, be maintained substantially constant, and the relationship between rotational speed of each of the free power turbines 24 and that selected by its respective governor 26 will be the same for all the free power turbines 24.

This will, of course, mean that all the free power turbines 24 will be temporarily underpowered and, as a result, the contacts 52, 53 will be brought out of contact with each other. The device 55 will therefore send signals to the fuel supply control units 21, as a result of which more fuel will be supplied to the engines 11, so that the rotational speeds of all the free power turbines 24 will be brought to the individually selected values. At the same time, of course, the nozzle guide vanes 25 of the various free power turbines 24 will be adjusted so as to effect an appropriate increase in the total area of the outlets 23.

Thus, the rotational speeds of the free power turbines 24 will be brought to the individually selected values without there being any substantial alteration of the total effective areas of the outlets 23 prior to the adjustment of the fuel supply to the engines 11. In consequence, the risk that the compressors 14 will surge or that there will be choked flutter of their compressor blades is avoided, whereas such risk would otherwise arise from any mismatching of the outlet area of the engines 11 with respect to the volume of jet gases produced thereby.

It will also be noted that any change in load on a free power turbine 24 effects very rapid adjustment of the fuel supply to the engines 11.

The said linkage 31, 34, 35, 37, 40 preferably uses rotary shafts of large rotations having low friction, while the power servos 33 are arranged to have minimum input friction.

If there is a small non-linearity of the outlet area determined by the nozzle guide vanes 25 in relation to the position of the respective power servo 33, this may be compensated by forming the said linkage appropriately.

Under steady state conditions, there is no load required to hold the levers 31 and therefore no load in the springs 30.

Instead of providing contacts 52, 53, a hydraulic or other sensing system may be used. This system may be of the "proportional plus integral" type where the output signal is initially rapidly changed to a value proportional to the input load, and is then followed by a slow and progressive change.

I claim:

1. Powerplant comprising at least one gas turbine engine, a fuel supply therefor, a plenum chamber which is arranged to receive exhaust gases from the engine and which has a plurality of outlets through each of which the exhaust gases may be discharged, a plurality of free power turbines which are respectively mounted in the outlets, and control means, responsive to changes in the rotational speeds of the free power turbines, for effecting adjustment of the fuel supply to the engine, said control means comprising outlet area adjustment devices for altering the effective areas of the respective outlets so as to adjust the rotational speeds of the respective free power turbines, and means interconnecting the outlet area adjustment devices so that increases and decreases in one said area are respectively accompanied by decreases and increases in any other said area, whereby the total effective area of all the outlets, prior to the said adjustment of the fuel supply, is maintained substantially constant.

2. Powerplant as claimed in claim 1 in which each free power turbine is provided with a governor which is responsive to the rotational speed of the respective turbine and which is connected to the respective outlet area adjustment device so as to be able to adjust the latter, a linkage which interconnects the outlet area adjustment devices and which ensures that the forces applied by the governors to the outlet area adjustment devices effect adjustment of the latter so that the relationship between the rotational speed of each of the free power turbines and that selected by its respective governor is substantially the same for all the free power turbines, and means connected to the said linkage for controlling the fuel supply to the engine in such a way that the rotational speeds of the various free power turbines are brought to individually selected values.

3. Powerplant as claimed in claim 2 in which the linkage is connected to an anchorage by means which urge the linkage towards the anchorage, but which permit some limited movement of the linkage away from the anchorage.

4. Powerplant as claimed in claim 3 in which the means for controlling the fuel supply is itself controlled in dependence upon the position of the linkage with respect to the anchorage.

5. Powerplant as claimed in claim 4 comprising means for adjusting the connection between the linkage and the anchorage in dependence upon the number of engines being employed.

6. Powerplant as claimed in claim 2 in which each outlet area adjustment device comprises variable nozzle guide vanes.

7. Powerplant as claimed in claim 6 in which the variable nozzle guide vanes of each turbine are adjusted by a power servo which is itself controlled in dependence upon the position of a lever, said lever forming part of said linkage and being connected by a resilient connection to the respective governor so as to tend to be positioned thereby.

References Cited

UNITED STATES PATENTS

| | | | |
|---|---|---|---|
| 3,243,596 | 3/1966 | Loft | 60—39.25 XR |
| 3,257,807 | 6/1966 | Hornschuch et al. | 60—39.24 |
| 3,308,618 | 3/1967 | Jubb et al. | 60—39.15 |

JULIUS E. WEST, *Primary Examiner.*